United States Patent Office 3,338,813
Patented Aug. 29, 1967

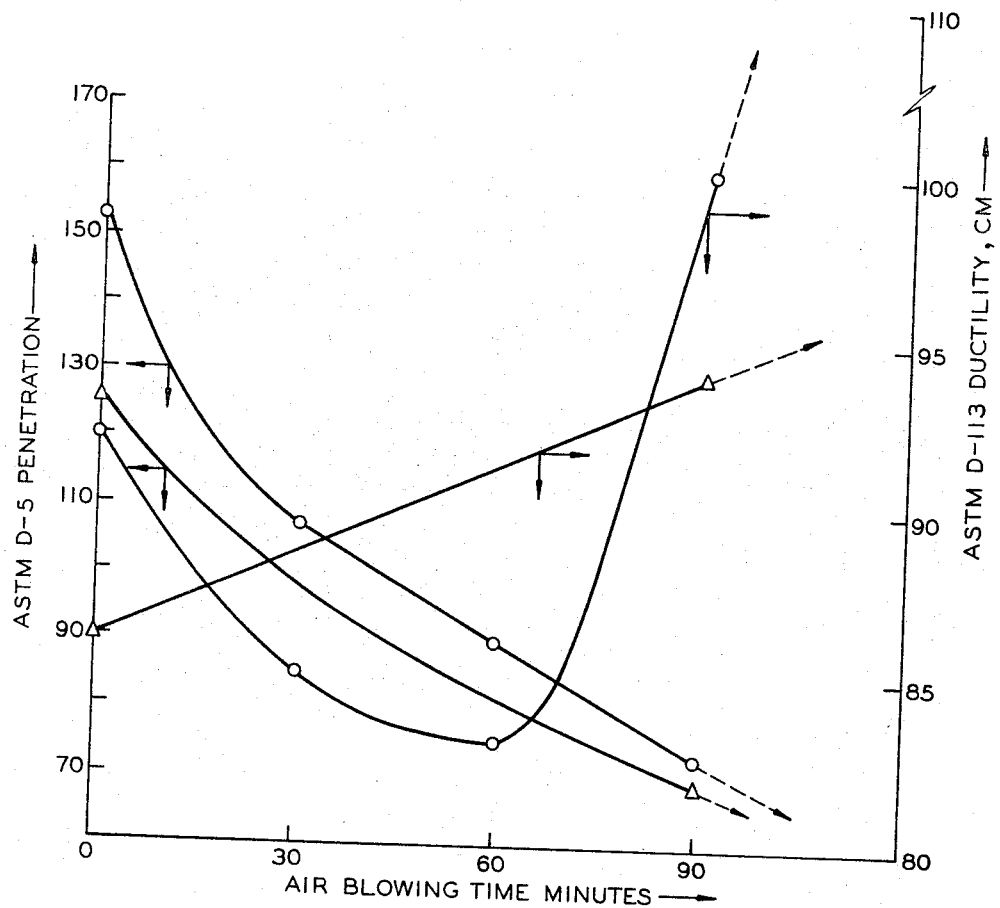

3,338,813
OXIDIZED ASPHALT BLEND
Joe Van Pool, Bartlesville, Okla., assignor to Phillips Petroleum Company, a corporation of Delaware
Filed July 23, 1965, Ser. No. 474,249
4 Claims. (Cl. 208—6)

ABSTRACT OF THE DISCLOSURE

An HF acid soluble oil is blended with a low resinous, high wax base asphaltic crude residue and thereafter the mixture is blown to produce an improved asphalt having a ductility at 77° F. of at least 100 and a penetration value at 77° F. in the range of 70 to 85.

---

This invention relates to the production of high quality asphalt. In one of its aspects it relates to the production of marketable asphalt from a low resinous, high wax base asphalt by mixing with the low resinous asphalt an acid soluble oil and blowing the mixture resulting therefrom. In another of its aspects, the invention relates to the production of high ductility asphalt by mixing with a low resinous, high wax base asphalt a minor amount of acid soluble oil and air blowing the mixture for a length of time sufficient to bring the ductility and penetration properties within specified limits. In another of its aspects, the invention relates to a specification asphalt produced by air blowing a mixture of acid soluble oil and low resinous, high wax base asphalt.

In the production of asphalts, the problem of adapting the asphalts for their intended uses by blending procedures and the like is of major importance. Asphalt compositions vary widely in their physical properties even when procured from the same source. For example, scarcely any two deposits of native asphalt are alike in their properties or chemical compositions. Hence, when making additions to improve the properties of an asphalt it is not always possible to predict with accuracy what the characteristics of the final asphaltic product will be.

By asphalt, I means a species of bitumen and pyrogenous substances of dark color, variable hardness, comparatively non-volatile; composed principally of hydrocarbons substantially free from oxygenated bodies; and including mineral matter, the non-mineral constituents being fusible, and largely soluble in carbon disulfide. The definition applies to native asphalts and asphalts derived from crude hydrocarbon oils. Native asphalts include asphalts occurring naturally in a pure or fairly pure state and also asphalts associated naturally with a substantial proportion of mineral matter, for example, sand, sandstone, limestone, clay, shale, etc. Pyrogenous asphalts include residues obtained from the distillation, blowing, etc., of petroleum, for example: residual oils, such as are produced by steam distillation of asphaltic petroleum, dry or steam distillation of semi-asphaltic petroleum or dry distillation of non-asphaltic petroleum; blown asphalts, such as are produced by blowing air through heated residual oils; residual asphalts, such as are produced by distillation of semi-asphaltic and asphaltic petroleums; sludge asphalts, such as are produced from the acid sludge obtained in the purification of petroleum distillates with sulfuric acid; cut back asphalts, etc.

Many asphalts, in order to be suitable for various uses, e.g., as asphalt cements, must be treated to give them certain properties, such as capacity for elongation or stretching, otherwise known as ductility, and hardness or plasticity, commonly known as penetration. Generally, a combination or blending of asphalts with other asphalts or similar products, and/or blowing of the asphalt are used to bring the asphalt or asphalt cement within specified values for ductility and penetration. It has been found that with certain low resinous asphalts blowing will not bring the ductility up to the minimum specified value. In particular, a low resinous, high wax base asphalt has been found to be unmarketable even after extended blowing because the ductility values cannot be brought up to a specified value, and even in trying to approach the minimum ductality value, the penetration value is decreased to below the minimum sepcification value. Also, it has been found that when a blend of an air blown, low resinous, high wax content asphalt was made with sufficient HF acid soluble oil to make the blend meet the ductility specification, there resulted a penetration of the blend that was too high to meet the penetration specification.

I have now found that this low resinous, high wax base asphalt can be brought to specified values for ductility and penetration by blending the asphalt with acid soluble oil and then blowing the mixture.

By various aspects of this invention, one or more, or others, of the following objects can be obtained.

It is an object of this invention to provide an inexpensive method for increasing the ductility and decreasing the penetration of a low resinous base asphalt.

It is a further object of this invention to produce a marketable asphalt from a low resinous, high wax base asphalt.

Other aspects, objects and the several advantages of this invention are apparent to one skilled in the art from a study of this disclosure, the drawing and the appended claims.

According to the invention, low resinous, high wax crude residues are mixed with acid soluble oil from an HF alkylation process and the mixture is air blown.

The asphalts to which the invention is applicable include all low resinous base crude residues. Examples of residues or residuums which are low in resinous materials and high in waxy components include residues produced from the following types of crude oils; Rangely (Colorado) crude; Bowes' Dome (Montana); Red Wash (Colorado-Wyoming); Santa Maria (California), etc.

These residuums or asphalts are recovered from their crude oils by, for example, vacuum flashing and/or solvent deasphalting using, e.g., liquid propane and/or liquid butane, or the like, in the deasphalting operation.

The amount of waxy components in these crude oils ranges in the order of from about 0.5 to 10 weight percent. The amount of resinous materials is difficult to determine, except that an insufficient amount of resinous material in the final asphalt product prevents the asphalt from passing both the ASTM Ductility Test (ASTM D113) and the ASTM Penetration Test (ASTM D5). See the Petroleum Refiner, February 1952, page 139, relating to resins. The resins quantity is usually present in the range of 1 to 10 weight percent.

The acid soluble oil which is blended with the asphalt is produced as a by-product in hydrocarbon conversion processes in which hydrofluoric acid is employed as a catalyst. An example of such a conversion process is the HF catalytic alkylation of isoparaffins with olefins or aromatics. In such process, a hydrocarbon phase and an acid phase are formed. The hydrocarbon phase and the acid phase are separated and hydrofluoric acid is recovered from the acid phase and returned to the conversion system. The materials remaining after the removal of the hydrofluoric acid from the acid phase comprise a composition known as "HF acid soluble oil." It is not known exactly what materials make up the acid soluble oil. The acid soluble oil contains fluoro-hydrocarbon compounds and is, however, highly unsaturated and high in aromatic content. See pages 13, 27 and 184 of "Hydrofluoric Acid Alkylation," Phillips Petroleum Company (1946), for details on the acid soluble oil and its recovery.

Generally, the amount of acid soluble oil added to the asphalt will be in the range of 1 to 10 percent based on weight of asphalt, preferably 2 to 8 percent based on the weight of asphalt, the quantity added being an amount so that the final air blown asphalt product will pass ductility and penetration specifications.

The following is a specific example of the invention.

Specific example

Rangely crude oil asphalt produced by propane deasphalting Rangely crude having about 3 percent by weight waxy-materials and about 2 percent by weight resinous material was mixed with HF acid soluble oil, recovered from an HF acid catalyst rerun system, in an alkylation process wherein isobutane and propylene-butylenes were reacted to produce high octane gasoline, and blown with air for various lengths of time. About 95 parts of asphalt and 5 parts acid soluble oil by volume were used. The effect of the blowing on the asphalt with and without the addition of acid soluble oil is shown in the table below. All blowing occurred in the temperature range of 400 to 410° F.

The capacity of an asphalt (or other bituminous material) for elongating or stretching, i.e., ductility, is determined by making a briquette of the material in a ductility mold. The ductility of the bituminous material is measured by the distance to which the briquette will elongate before breaking. The briquette is pulled apart while immersed in water, the test being made at a temperature of 25° C.±0.5° C. and with a speed of 5 cm. per minute (±5 percent). Three tests were taken and the average reported. The distance through which the slips, attached to the bituminous material, have been pulled to produce a rupture is measured in centimeters. See ASTM D113 for the "Ductility Test" used herein.

The hardness or plasticity, i.e., penetration value is determined by the use of a penetrometer. Penetration is defined as the consistency of a bituminous material expressed as the distance that a standard needle vertically penetrates a sample of the material under known conditions of loading, time, and temperature, using a total of 100 gms., 5 seconds, and 25° C., respectively. See ASTM D5 for the "Penetration Test" used herein.

As was pointed out earlier, the addition of acid soluble

TABLE

| Sample | Blowing Time (min.) | Original Sample | | Penetration Ratio [1] |
|---|---|---|---|---|
| | | Penetration at 77° F. ASTM D5 (5 sec., 100 gm.) | Ductility ASTM D 113 (77° F., 5 cm. per min.) | |
| Asphalt (120–150 Pen.) | | 125 | 86 | 18.4 |
| 95% Asphalt (120–150 Pen.) Plus 5% Acid Soluble Oil | | 154 | 92 | 16.9 |
| Asphalt (120–150 Pen.) | 90 | 69 | 94 | |
| 95% Asphalt (120–150 Pen.) Plus 5% Acid Soluble Oil | 30 | 107 | 85 | 20.6 |
| Do | 60 | 91 | 83 | 23.1 |
| Do | 90 | [2] 73 | [3] 100+ | [4] 26.0 |

[1] Penetration Ratio=100×Penetration at 39.2° F./Penetration at 77° F.
[2] 70–85 Penetration Range Asphalt Cement.
[3] 100 cm. is minimum allowable.
[4] Minimum allowable is 25.

The specification ranges which were sought are a ductility in excess of 100 and a penetration value between 70 and 85. As can be seen from the foregoing table, the unblended asphalt had a penetration at 77° F. of 125 and a ductility of 86. Even after blowing, the unblended asphalt had a penetration value of 69 (too low) and a ductility value of 94 (too low). The ductility of the unblended air blown asphalt did increase, but not enough to meet specification; and the penetration did decrease, but from too great of a penetration value to too low of a penetration value when it was attempted to air blow the material to try to reach the specification minimum of 100 centimeters for ductility. The blended asphalt and acid soluble oil in the unblown condition had a penetration value at 77° F. of 154 and a ductility of 92. After blowing for 90 minutes at 400–410° F., the acid soluble oil-asphalt blend reached a penetration value at 77° F. of 73 and a ductility value of greater than 100. Only this last example met the specification values.

The results are further exemplified by the figure, which shows a graph of the effect of blowing time on the penetration and ductility values for blended and unblended low resinous base asphalt. As can be seen from the figure, the ductility value of the acid soluble oil-asphalt blend increases sharply to 100 and the penetration falls to a value within the specified range, when the blend has been blown for 90 minutes.

It will be obvious that with higher temperatures and shorter times of blowing specification asphalt can also be made. In addition, the amount of acid soluble oil, the time of blowing, and the temperature of blowing can all be varied to produce specification asphalt.

oil after blowing the unblended asphalt will not produce specification asphalt. It is necessary to blend the acid soluble oil with the low resinous asphalt before the blowing operation. The acid soluble oil itself polymerizes during air blowing. The polymerization of the acid soluble oil in the blend affects the ductility and penetration of the final product.

As used in the specification, crude residues include crude oil, residuum, topped crude and the like.

It is to be understood that the term "air blowing" includes oxidizing of the mixture of acid soluble oil and crude residue with an oxygen containing gas, with or without an additional catalytic agent.

In general, the temperature for blowing can be in the range of 350 to 550° F., preferably 375 to 450° F. The time of blowing can be in the range of 30 to 200, preferably 60 to 120 minutes. The time of air blowing and the temperature used are chosen so that a specification asphalt cement can be made. These conditions depend upon the specific asphalt used, the quantity of HF acid soluble oil used, and the specifications desired to be met. Routine experimentation can be used to determine the specific conditions for any specific blend, and for the specific asphalt product desired.

Reasonable variation and modification are possible within the scope of the foregoing disclosure, the drawing, and the appended claims to the invention, the essence of which is that acid soluble oil and low resinous base asphalt are mixed and blown for a time sufficient to increase the ductility and decrease the penetration to specific values and to within specified ranges, respectively.

I claim:
1. A process for the production of asphalt having a ductility at 77° F. of at least 100 centimeters and a penetration value at 77° F. in the range of 70 to 85 from a low resinous, high wax base asphaltic crude residue, comprising mixing with said asphaltic crude residue HF acid soluble oil containing fluoro-hydrocarbon compounds and thereafter blowing the mixture at a temperature and for a time sufficient to bring the ductility at 77° F. up to at least 100 centimeters and penetration values at 77° F. within the range of 70 to 85.
2. A process according to claim 1 wherein the amount of HF acid soluble oil mixed with the asphaltic crude residue is in the range of 1 to 10 parts of HF acid soluble oil per hundred parts of asphaltic crude residue.
3. A process according to claim 1 wherein about 5 parts of HF acid soluble oil per 100 parts of asphaltic crude residue are blended and the mixture is heated to a temperature of about 400° F. and blown for about 90 minutes.
4. The product produced according to claim 2.

References Cited
UNITED STATES PATENTS

| | | | |
|---|---|---|---|
| 2,067,264 | 1/1937 | Ebberts | 208—6 |
| 2,434,000 | 1/1948 | Matuszak | 260—683.41 |
| 2,494,867 | 1/1950 | Frey | 260—683.41 |
| 2,575,718 | 11/1951 | Lee et al. | 208—1 |
| 2,772,316 | 11/1956 | Schneider | 106—285 |
| 2,775,530 | 12/1956 | Gayle et al. | 106—280 |
| 2,889,231 | 6/1959 | Gayle et al. | 106—280 |

FOREIGN PATENTS 456,600 11/1936 Great Britain.

DANIEL E. WYMAN, *Primary Examiner.*

P. E. KONOPKA, *Assistant Examiner.*